(12) United States Patent
Sivacoe

(10) Patent No.: US 6,359,645 B1
(45) Date of Patent: Mar. 19, 2002

(54) PIPE INSPECTION DEVICE AND METHOD

(76) Inventor: Orlande Sivacoe, #601, 4700 - 55 Street, Red Deer, Alberta (CA), T4N 2H8

( * ) Notice: Subject to any disclaimer, the term of this patent is extended or adjusted under 35 U.S.C. 154(b) by 0 days.

(21) Appl. No.: 09/233,906

(22) Filed: Jan. 21, 1999

(30) Foreign Application Priority Data

Dec. 21, 1998 (CA) ............................................. 2257014

(51) Int. Cl.⁷ .......................... G01M 14/00; F15L 55/26
(52) U.S. Cl. ...................... 348/84; 73/866.5; 356/241.4
(58) Field of Search ......................... 348/84; 356/241.4, 356/241.6; 73/865.8, 866.5

(56) References Cited

U.S. PATENT DOCUMENTS

| | | | | |
|---|---|---|---|---|
| 3,852,526 A | * | 12/1974 | McCollough et al. | 356/241.1 X |
| 4,515,435 A | * | 5/1985 | Anderson | 385/103 |
| 5,025,778 A | * | 6/1991 | Silverstein et al. | 600/104 |
| 5,257,669 A | * | 11/1993 | Kerley et al. | 901/1 X |
| 5,445,155 A | * | 8/1995 | Sieben | 600/443 |

FOREIGN PATENT DOCUMENTS

| | | | | |
|---|---|---|---|---|
| DE | 2912314 | * | 10/1980 | F17D/5/00 |

* cited by examiner

Primary Examiner—Thomas P. Noland
(74) Attorney, Agent, or Firm—Anthony R. Lambert

(57) ABSTRACT

A method of inspecting a pipe, by pushing a video camera through the pipe on a cable, with a wire helical coil disposed between the video camera and a stop on the cable, the wire helical coil being long enough to permit passage of the video camera around a first bend. As the video camera is pushed into the pipe and moves around the first bend, a cable stiffener is placed on the cable to stiffen the cable in the first straight section while permitting the cable to move through the cable stiffener. The video camera is then pushed down a second straight section and around a second bend to view a third straight section. The cable stiffener comprises a rod having first and second ends, a straight slot running along the rod from the first end to the second end for receiving a cable, and the rod having an enlarged portion along part of the rod forming a centralizer.

13 Claims, 4 Drawing Sheets

PIPE INSPECTION DEVICE AND METHOD

FIELD OF THE INVENTION

This invention relates to a device and method for inspecting pipes.

BACKGROUND OF THE INVENTION

Pipes used for example-in heaters and heat exchangers tend to have many bends, many of which are tight U-turns. It is desirable to be able to inspect deeply into the pipes, using a video camera, but the bends make it hard to get the video camera far into the pipe. The first straight section can usually be inspected, and also the second straight section, but it is difficult to inspect the third straight section.

Pipe inspection devices are known which have a video camera head at the end of a cable. A wire helical coil (spring or snake) is disposed between a stop on the cable and the video camera head. The cable may pass through the wire helical coil. When such a device is used to inspect a pipe with bends in it, the wire helical coil can be easily pushed around the first bend and the video camera used to inspect the second straight section. However, as the video camera head passes into the second bend, binding at the first bend and first straight section due to friction of the cable as it winds through the first bend prevents the video camera head from being pushed around the second bend.

SUMMARY OF THE INVENTION

It is an object of this invention to provide a pipe inspection device and method for inspecting past the second bend in a pipe having many bends.

There is therefore providing in accordance with an aspect of the invention, a method of inspecting a pipe having a first, second and third straight sections and first and second bends, the method comprising the steps of:

pushing a video camera through the pipe on a cable, with a wire helical coil disposed between the video camera and a stop on the cable, the wire helical coil being long enough to permit passage of the video camera around the first bend;

as the video camera is pushed into the pipe and moves around the first bend, placing a cable stiffener on the cable to stiffen the cable in the first straight section while permitting the cable to move through the cable stiffener; and pushing the video camera down the second straight section and around the second bend to view the third straight section.

In a further aspect of the invention, there is provided a pipe inspection device, comprising a video camera head, a cable having a stop, a wire helical coil between the video camera head and the stop and a cable stiffener lining the cable on the other side of the stop from the wire helical coil.

In a further aspect of the invention, there is provided a cable stiffener, comprising:

a rod having first and second ends;

a straight slot running along the rod from the first end to the second end for receiving a cable; and the rod having an enlarged portion along part of the rod forming a centralizer.

Preferably, multiple cable stiffeners are placed on the cable and each cable stiffener is placed on the cable such that the straight slots of adjacent cable stiffeners are rotationally offset from one another. The cable stiffener preferably has a centralizer at one end and the cable stiffener is urged into the pipe with the centralizer forward.

In a further aspect of the invention, the first and second ends of the cable stiffeners are configured for mating with respective second and first ends of adjacent cable stiffeners, and are preferably threaded.

In a further aspect of the invention, the enlarged portion is disposed at one of the ends of the rod, and is tapered towards the second end of the rod.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

Figure 1:
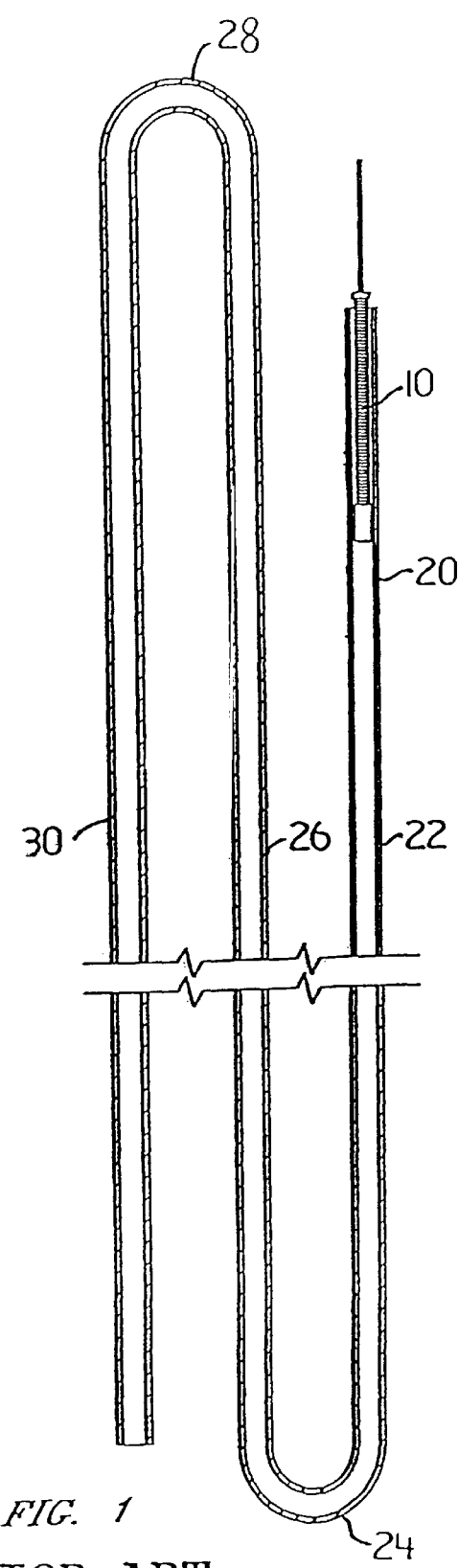
FIG. 1 is a section through a pipe with two bends and three straight sections showing a prior art pig inspection device which is only capable of inspecting the second straight section.
Figure 3:
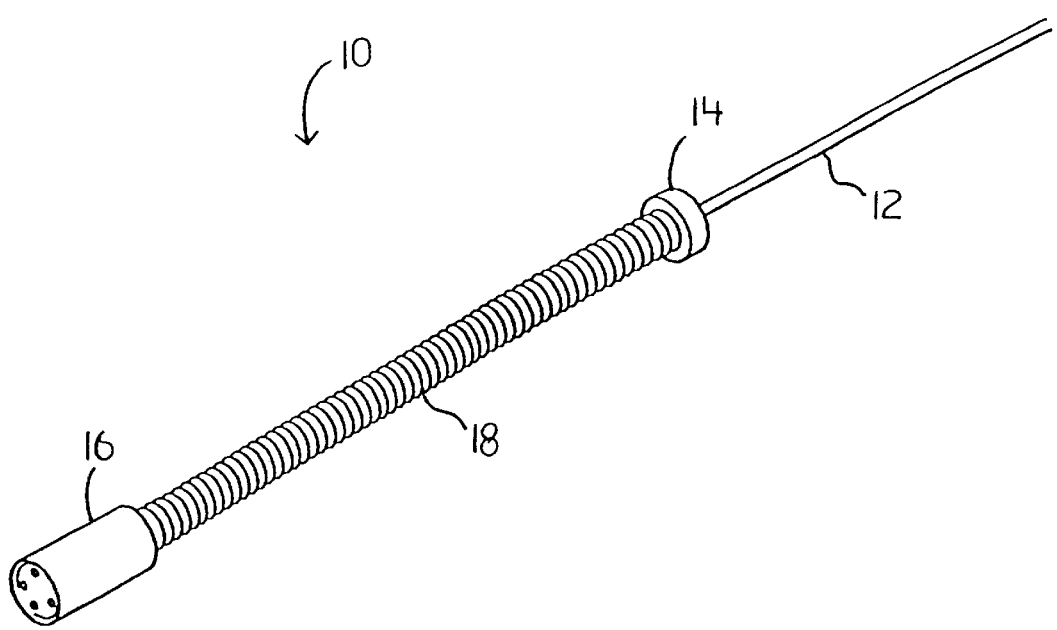
FIG. 3 is a perspective view of a prior art pipe inspection device.
Figure 4:
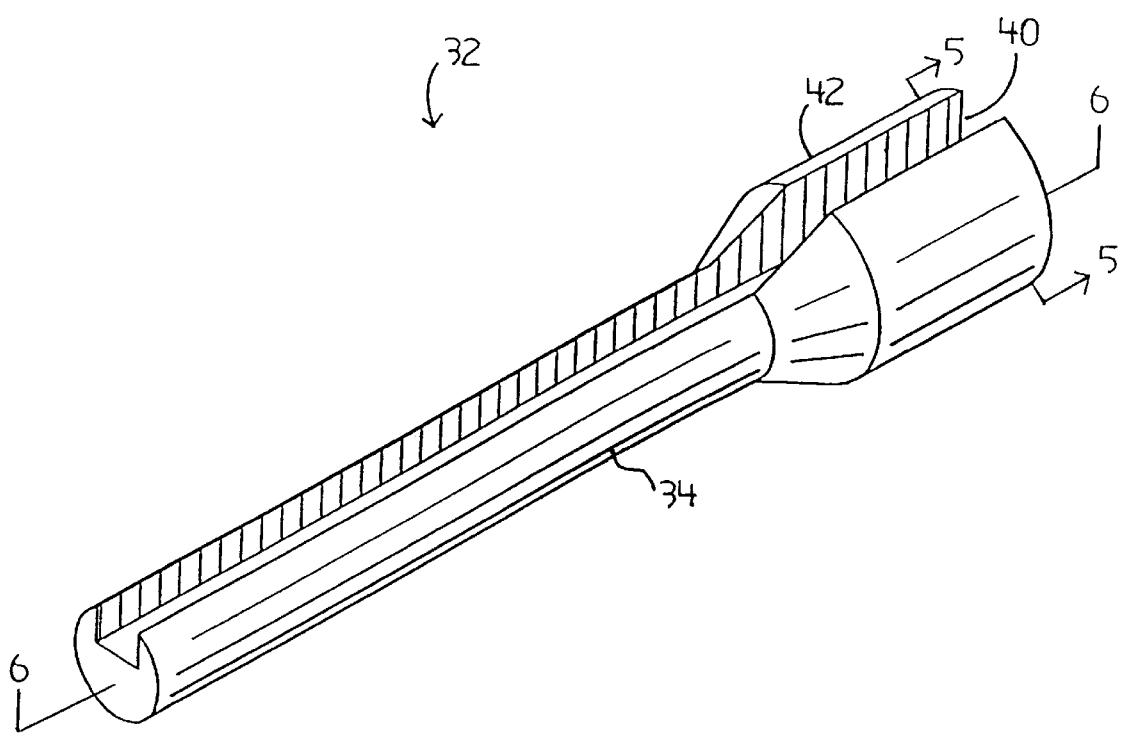
FIG. 4 is a perspective view of a pipe inspection device injector according to the invention.
Figure 5:
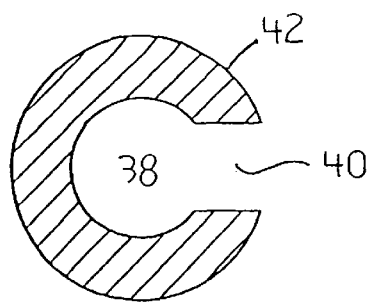
FIG. 5 is a section through the pipe inspection device injector of FIG. 4 along the line 5—5.
Figure 6:
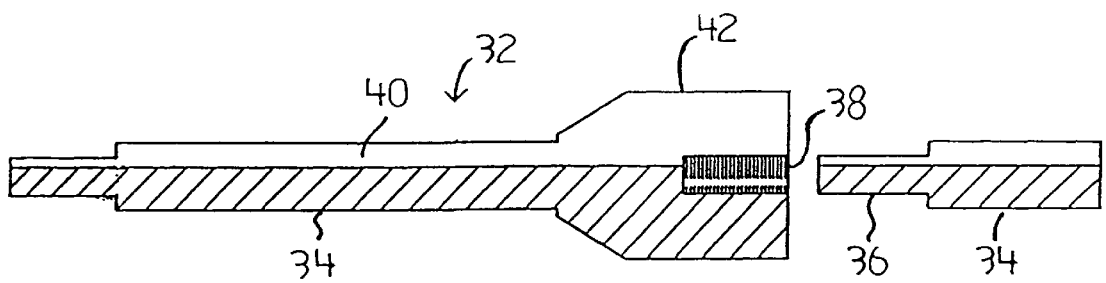
FIG. 6 is a section through the pipe inspection device injector of FIG. 4 along the line 6—6.
Figure 7:
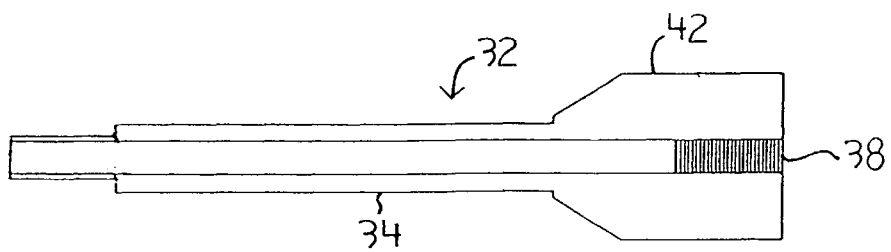
FIG. 7 is a top view of the pipe inspection device injector of FIG. 4.

Referring to FIG. 1 and 3, there is shown a prior art pipe inspection device 10 which is formed of a cable 12, having a stop 14 (a disc secured in conventional manner to the cable 12), a video camera head 16, and a wire helical coil 18 lying on the cable 12 between the stop 14 and video camera head 16. It is possible to attach the wire helical coil 18 directly from the stop 14 to the video camera head 16, and terminate the cable 12 at the stop 14, but this is slightly more difficult to build and is not practical. Nonetheless, whether the cable 12 does terminate at the stop 14 or not is not material to the invention. The pipe inspection device 10 is shown at the entry of pipe 20, which includes straight section 22, first bend 24, second straight section 26, second bend 28 and third straight section 30. With the configuration shown, the video camera head 16 will not be able to pass around the second bend 28 since friction of the cable 12 on the inside of the pipe 20 at bend 24 will cause the cable 12 to buckle in the straight section 22, thus increasing the friction and preventing the video camera head 16 from passing around the second bend 28.

Figure 2:
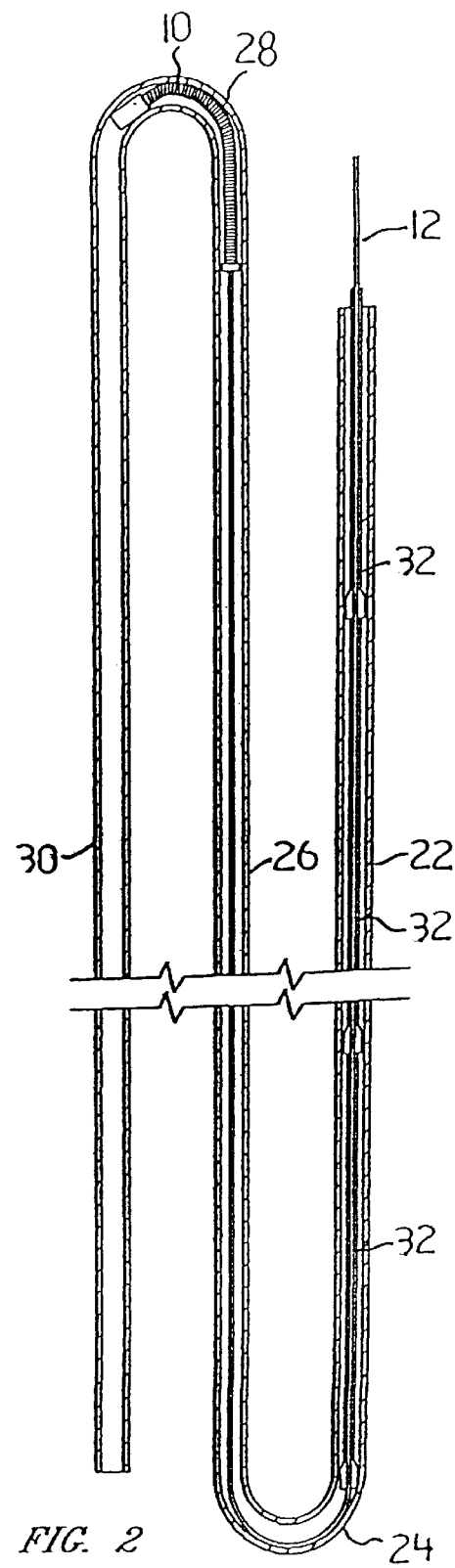
FIG. 2 is a section through the pipe of FIG. 1 showing use of the invention to inspect the third straight section.

Referring to FIG. 2, a pipe inspection device 10 that allows viewing of the third straight section 30 is shown. The pipe inspection device 10 has a conventional video camera head 16, conventional cable 12 having a stop 14, and conventional wire helical coil 18 between the video camera head 16 and the stop 14. In addition, a cable stiffener 32 lines the cable 12 on the other side of the stop 14 from the wire helical coil 18. Although it is possible to use a single cable stiffener 32, in practice the required length of cable stiffener, which is close to the length of the straight section, is too long to be handled in the often confined spaces in which the pipe is located. Therefore, it is preferable to use plural cable stiffeners 32 lining the cable 12 on the other side of the stop 14 from the wire helical coil 18.

Referring to FIGS. 4–7, each cable stiffener 32 is formed of a rod 34, which may be molded plastic or metal, such as aluminum, which is preferred for its lightness, having an externally threaded male end 36 (not shown in FIG. 4) and internally threaded female end 38 configured to mate with each other (and thus also with respective female and male ends of adjacent cable stiffeners 32). A straight slot 40 forming a channel with square sides runs along the rod 34 from end to end, and is sized for receiving the cable 12. The rod 34 also has an enlarged portion along part of the rod, preferably at the female end, forming a centralizer 42. The centralizer 42 also provides strength for the male-female connection. The centralizer 42 may be cylindrical as shown, or could have several radially oriented fins. Other designs may occur to those skilled in the art. The centralizer 42 centers the cable 12 in the pipe 20 and, when several cable stiffeners 32 are placed end to end, keep the slot 40 straight even though adjacent cable stiffeners 32 may be twisted or rotationally offset from each other. It is preferred that when several cable stiffeners 32 are used, that adjacent ones be rotationally offset from each other to prevent the cable 12 from moving too much in the slot 40. The cable stiffeners 32 may be about 2–4 meters long or such other length that is convenient to handle.

In a method of operation of the pipe inspection device 10 with the cable stiffeners 32, the video camera 16 is first through the pipe 20 on cable 12. As the video camera 16 is pushed into the pipe 20 and moves around the first bend 24, one or more cable stiffeners 32, preferably rotationally offset from one another, are placed on the cable 12 to stiffen the cable 12 in the first straight section 22 while the cable 12 moves through the cable stiffener 32. Preferably the cable stiffeners 32 enter the pipe with the enlarged portion forward. The video camera 16 is then pushed down the second straight section 26 and around the second bend 28 to view the third straight section 30.

A person skilled in the art could make immaterial modifications to the invention described in this patent document without departing from the essence of the invention that is intended to be covered by the scope of the claims that follow.

The embodiments of the invention which an exclusive property or privilege is claimed are defined as follows:

1. A pipe inspection device, comprising:
   a video camera head;
   a cable having a stop;
   a wire helical coil between the video camera head and the stop; and
   plural cable stiffeners lining the cable on the other side of the stop from the wire helical coil.

2. The pipe inspection device of claim 1 which each cable stiffener comprises:
   a rod having first and second ends;
   a straight slot running along the rod from the first end to the second end for receiving a cable; and
   the rod having an enlarged portion along part of the rod forming a centralizer.

3. The pipe inspection device of claim 2 in which the first and second ends of each cable stiffener are configured for mating with respective second and first ends of adjacent cable stiffeners.

4. The pipe inspection device of claim 1 in which the first and second ends of each cable stiffener are threaded.

5. The pipe inspection device of claim 1 in which the enlarged portion is disposed at the first end of the rod.

6. The pipe inspection device of claim 5 in which the enlarged portion is tapered towards the second end of the rod.

7. The pipe inspection device of claim 5 in which a cable stiffener lying on the cable adjacent the stop is oriented with the centralizer against the stop.

8. A pipe inspection device, comprising:
   a video camera head;
   a cable having a stop;
   a wire helical coil between the video camera head and the stop; and
   a cable stiffener lining the cable on the other side of the stop from the wire helical coil, the cable stiffener comprising a rod having first and second ends, a straight slot running along the rod from the first end to the second end for receiving a cable; and the rod having an enlarged portion along part of the rod forming a centralizer.

9. The pipe inspection device of claim 8 in which the first and second ends of the cable stiffener are configured for mating with respective second and first ends of adjacent cable stiffeners.

10. The pipe inspection device of claim 8 in which the first and second ends of the cable stiffener are threaded.

11. The pipe inspection device of claim 8 in which the enlarged portion is disposed at the first end of the rod.

12. The pipe inspection device of claim 11 in which the enlarged portion is tapered towards the second end of the rod.

13. The pipe inspection device of claim 11 in which the cable stiffener is oriented with the centralizer against the stop.

* * * * *